United States Patent
Bries

(10) Patent No.: US 7,048,267 B2
(45) Date of Patent: May 23, 2006

(54) ADHESIVELY MOUNTED ANGLED CLAMP DEVICE

(75) Inventor: James L. Bries, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 133 days.

(21) Appl. No.: 10/729,147

(22) Filed: Dec. 5, 2003

(65) Prior Publication Data

US 2005/0121845 A1   Jun. 9, 2005

(51) Int. Cl.
*B25B 1/20* (2006.01)

(52) U.S. Cl. .................. 269/41; 269/249; 269/254 CS; 269/224

(58) Field of Classification Search .................. 269/37, 269/41, 249, 266, 254 CS, 224, 152–156, 269/21, 95; 156/580
See application file for complete search history.

(56) References Cited

U.S. PATENT DOCUMENTS

| | | | |
|---|---|---|---|
| 2,642,905 A * | 6/1953 | Hewat ........................ 269/249 |
| 4,024,312 A | 5/1977 | Korpman | |
| 4,352,476 A * | 10/1982 | Meeks ........................ 248/74.1 |
| 4,457,503 A | 7/1984 | Connor | |
| 5,516,581 A | 5/1996 | Kreckel et al. | |
| 5,820,116 A | 10/1998 | Haese | |
| 6,231,962 B1 | 5/2001 | Bries et al. | |
| 6,318,712 B1 | 11/2001 | Coffman | |

FOREIGN PATENT DOCUMENTS

| | | |
|---|---|---|
| DE | 33 31 016 C2 | 7/1992 |
| DE | 200 03 647 U1 | 5/2000 |
| FR | 2 660 711 | 10/1991 |
| WO | WO 87/01324 | 3/1987 |

* cited by examiner

Primary Examiner—Robert C. Watson
(74) Attorney, Agent, or Firm—David B. Patchett

(57) ABSTRACT

An adhesively mounted angled clamp-like device for producing a compressive force or tensile force includes a frame, at least two plungers arranged at an angle movably connected with the frame, and double-sided stretch releasing adhesive attached to at least one of the frame and the plungers. The frame and/or plungers can be firmly adhesively bonded to a surface or object and later cleanly removed from the frame, plungers, and/or surface without damaging the surface and without leaving adhesive residue by stretching the adhesive.

8 Claims, 2 Drawing Sheets

ADHESIVELY MOUNTED ANGLED CLAMP DEVICE

FIELD

The present invention relates generally to a device that can be used to apply two or more compressive or tensile forces to a surface or object, and more particularly, to such a device that can be attached to one or more surfaces arranged at an angle using stretch releasing adhesive, whereby the device can be firmly attached to the surface but may be easily and cleanly removed from the surface without damaging the surface.

BACKGROUND

Angle clamps are known in the prior art. U.S. Pat. No. 6,318,712, (Coffman), for example, discloses a clamp for maintaining two butting segments in an adjoining relationship. Suction attachable clamps are also known in the prior art. U.S. Pat. No. 5,820,116 (Haese), for example, discloses a suction attachable retaining clamp for holding an object such as a molding or mounting bracket against a surface such as a windshield. U.S. Pat. No. 4,457,503 (Conner) discloses a suction clamp for holding moldings in place on front or rear windshields of automobiles, while an adhesive material sets or dries, and it simultaneously prevents damage to the adjacent surface. Such clamps, however, are complicated to use, expensive, are limited to producing clamping/compressive forces, and, in the case of suction clamps, work best on clean, slightly moistened, non-porous surfaces such as metal and glass.

There is therefore a need for a simple and inexpensive clamp-like device that can be used to exert two or more forces at an angle. There is also a need for such a device that can be used for a variety of end use applications and can be used on a variety of surfaces under a variety of conditions.

SUMMARY

It would therefore be desirable to provide a simple and inexpensive single-sided clamp-like device that can be securely fastened to an angled surface or two items forming an angled surface, and can be readily removed without damaging the surface or leaving unwanted adhesive residue. It would also be desirable to provide such a clamp-like device that can be used as both a clamp to exert a compressive force, and as a device to produce a pulling or tensile force. It would also be desirable to provide a device that can be used on a wide variety of surfaces including metal, glass, paper, masonry and unfinished wood, and is not limited to use on non-porous surfaces such as metal and glass.

The present invention overcomes the above-identified limitations in the field by providing a simple and inexpensive angled clamp-like device that can be applied to a surface and can be used not only as a clamp, but can also be used to produce a pulling or tensile force at selected locations on a surface or an object. The present invention also provides a device that can be used on a wide variety of surfaces including paper, wood, and masonry, and is not limited to use on non-porous surfaces such as metal and glass.

In one embodiment, the present invention provides a clamp-like device comprising a frame, at least two plungers arranged at an angle movably connected with the frame, and double-sided stretch releasing adhesive attached to at least one of the frame and the plungers, whereby the frame and/or the plungers can be firmly adhesively bonded to a surface and cleanly removed from the surface without damaging the surface by stretching the adhesive.

In one aspect, the stretch releasing adhesive is attached to the frame. In another aspect, the stretch releasing adhesive is attached to the plungers.

In a specific embodiment, the frame includes an angle section comprising a pair of connecting portions arranged at an angle, and each connecting portion contains at least one opening. In another aspect, each opening is threaded and each plunger is externally threaded such that the plungers mate with the openings and are rotatably arranged within the associated openings.

In a more specific aspect of the invention, the frame further includes a leg portion extending perpendicularly from the end of each connecting portion, and further includes a foot portion arranged on the end of each leg portion. In another aspect, the stretch releasing adhesive for attaching the frame to a surface is provided on each foot portion.

In another embodiment, the frame includes a pair of parallel leg portions extending from the same connecting portion.

In another aspect, the plungers includes a head adapted to receive stretch releasing adhesive. The plunger may also include a handle to facilitate manual actuation of the associated plunger.

The present invention can be used for a wide variety of uses and applications such as holding an object or objects in place while an adhesive, such as a hot melt adhesive, glue, or epoxy sets, dries, or otherwise cures. This may be useful, for example, in gluing together the pieces of a picture frame. The device may also be provided with a pointed tip or drill bit to mark, pierce, or form a hole in a surface or object. The present invention may also find use in woodworking, crafts, or other uses in the home, office, or in industrial applications. For example, the present invention may be used to stamp or emboss a piece of paper or piece of wood.

BRIEF DESCRIPTION OF THE DRAWINGS

The present invention will be further described with reference to the accompanying drawings, in which.

DETAILED DESCRIPTION

Figure 1:
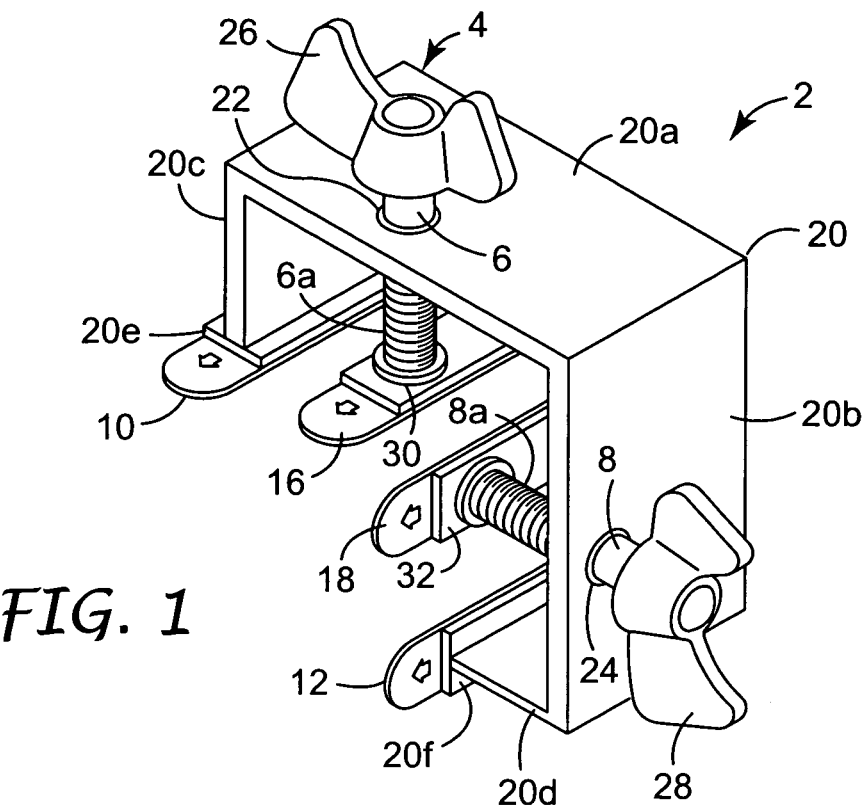
FIG. 1 is a perspective view of a device according to the invention.
Figure 2:
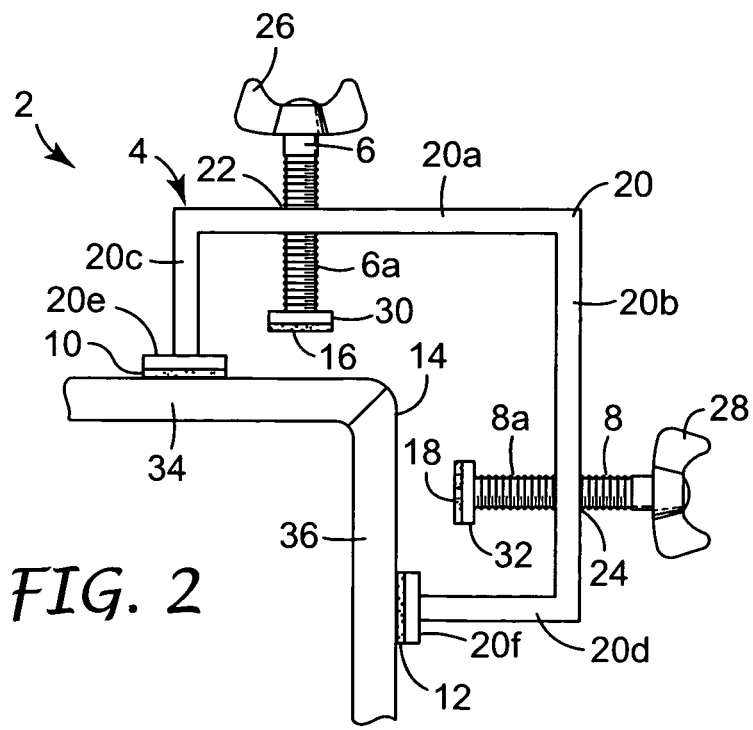
FIG. 2 is a side view of the device of FIG. 1 attached to a surface.

Referring now to the drawings, FIGS. 1 and 2 show an angled clamp-like device 2 including a frame 4, first and second plungers 6,8 rotatably attached to the frame 4, double-sided stretch releasing adhesive strips 10,12 attached to the frame 4 to removably adhesively bond the frame 4 to a surface 14, and double-sided stretch releasing adhesive strips 16,18 attached to the plungers 6,8 for adhesively bonding the plungers 6,8 to either the surface 14 or an object (not shown) which may be arranged between the plungers 6,8 and the surface 14. Throughout the description and the accompanying figures, functionally similar features are referred to with like reference numerals incremented by 100.

Stretch releasing adhesive tapes represent a class of high performance pressure-sensitive adhesives combining strong holding power with clean removal and no surface damage.

Such stretch releasing adhesive tapes are useful in a wide variety of assembling, joining, attaching, and mounting applications. The double-sided adhesive strips 10,12,16,18 may be any conventionally known stretch releasing adhesive tape including a stretch releasing adhesive tape with an elastic backing, a stretch releasing adhesive tape with a highly extensible and substantially inelastic backing, or a stretch releasing adhesive tape comprising a solid elastic pressure sensitive adhesive. For certain end-use applications, for example when it is not necessary to attach the frame 4 or plungers 6,8 to the surface 14, it may be desirable to replace one or more of the double-sided adhesive strips 10,12,16,18 with single-sided adhesive strips which are adhesively bonded to the device 2 to provide cushioning and thereby protect the surface 14 to which the device 2 is attached.

Specific tapes suitable for use in the various embodiments of the present invention include the pressure sensitive adhesive tapes with elastic backings described in U.S. Pat. No. 4,024,312 (Korpman), the pressure sensitive adhesive tapes with highly extensible and substantially inelastic backings described in U.S. Pat. No. 5,516,581 (Kreckel et al.) and Bries et al. U.S. Pat. No. (6,231,962), and the solid elastic pressure sensitive adhesive described in German Patent No. 33 31 016.

A suitable double-sided commercially available stretch releasing adhesive tape is the product sold under the trade designation COMMAND adhesive by 3M Company, St. Paul, Minn. This product is currently manufactured as discrete strips with one end of the strip including a non-adhesive pull tab to facilitate stretching of the strip during removal.

In the illustrated embodiment, the frame 4 includes an angle section 20 including first and second connecting portions 20a,20b arranged at an angle. It will be recognized that the connecting portions 20a,20b may be arranged at any angle depending on the intended end use application of the device, or that the device may be provided with a hinge to allow the angle to be adjusted. Each connecting portion 20a,20b contains a threaded opening 22,24, respectively for receiving plungers 6,8, respectively. The frame 4 further includes leg portions 20c,20d extending perpendicularly from the end of each connecting portion 20a,20b, respectively, and foot portions 20e,20f arranged at the end of each leg portion. Adhesive strips 10,12 are affixed to the bottom surfaces of the feet portions 20e,20f, respectively, to adhesively bond the frame 4 to surface 14, and thereby securely bond the device 2 to the surface 14.

Plungers 6,8 are arranged generally perpendicular to the respective connecting portions 20a,20b and include a cylindrical threaded body portion 6a,8a which rotatably engages openings 22,24, respectively, in the frame 4, a handle 26,28 arranged at one end of the body portion 6a,8a to facilitate manual rotation of the plungers 6,8 and a head 30,32 arranged at the end of the body portion 6a,8a opposite the handle 26,28. The handles 26,28 are arranged above the connecting portions 20a,20b of the frame 4 to allow a user to readily access the handle 26,28, and thereby manually rotate the plungers 6,8. The heads 30,32 are arranged below the connecting portions 20a,20b and are axially movable by rotational actuation of the plunger 6,8 via handles 26,28 either in the direction of the surface 14, thereby to apply a force to the surface, or away from the surface 14, thereby to generate a tensile force relative to the surface. Heads 30,32 are preferably connected with the plunger 6,8 with a slip fit type of connection to allow the body portions 6a,8a and the heads 30,32 to move independently. That is, the plunger body portions 6a,8a may be rotated while the heads 30,32 remains stationary, and the heads may pivot relative to the plunger body portions 6a,8a.

To use the device 2 as a clamp, the device is attached to the surface 14 with stretch releasing adhesive strips 10,12. One or both plungers 6,8 are then rotated such that the heads 30,32 move in the direction of the surface 14. As the plungers 6,8 move toward and engage the surface 14, a compressive force will be exerted on the surface 14. When used in this manner, the device can be used to join two items 34,36 which may be, for example, two pieces of a picture frame. It will be recognized that when the device is used in this manner (i.e. as a clamp or to generate a compressive force on a surface), adhesive strips 10,12 are needed to maintain the device 2 adjacent surface 14, but that adhesive strips 16,18 are not needed because the plungers 6,8 are maintained in contact with surface 14 via compression. Stated another way, when the device 2 is used as a clamp, the plungers 6,8 is forced against the surface 14 which, in turn, forces the frame 4 away from the surface 14, and the adhesive strips 10,12 serve to hold the frame 4 in contact with the surface 14 to allow the plungers 6,8 to exert a compressive force on the surface. To remove the device 2 from the surface 14, each adhesive strip 10,12 is stretched in the known manner to simultaneously debond the adhesive strip from the device and surface.

Conversely, to use the device 2 as a pulling device to generate a pulling or stretching force on surface 14 or on an object (not shown) arranged between the surface 14 and the heads 30,32, the heads 30,32 are attached to the surface 34 with stretch releasing adhesive strips 16,18, thereby adhesively bonding the plungers 6,8 to surface 14 or to the object (not shown) arranged between the heads 30,32 and the adhesive strips 16,18. Thus, when the plungers 6,8 are rotated such that the heads 30,32 move away from the surface 14, a tensile force will be exerted on the surface 14 or on the object. When used in this manner (i.e. as a pulling device to generate a tensile force relative to the surface), adhesive strips 16,18 are needed to attach the plungers 6,8 to the surface 14 or the object, but it will be recognized that adhesive strips 10,12 are not needed to secure the device 2 to the surface because the device is maintained in contact with the surface 14 via compression.

Figure 3:
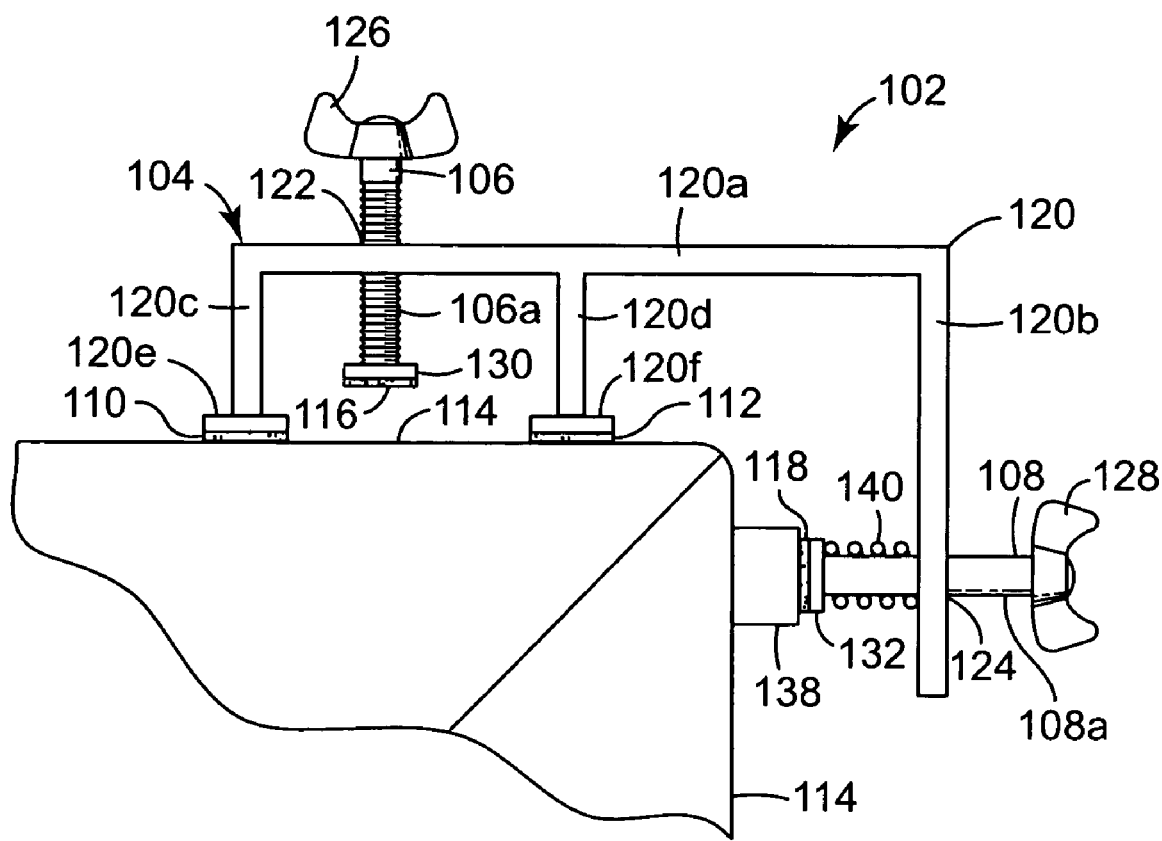
FIG. 3 is a side view of an alternative embodiment of the invention attached to a surface.

FIG. 3 shows a device 102 in accordance with an alternate embodiment of the invention. The device 102 is similar to the device 2 shown and described in FIGS. 1 and 2 above except in the device 102 shown in FIG. 3, both leg portions 120c, 120d extend from the same connecting portion 120a and are parallel, and the second plunger 108 is provided with a spring 140 instead of a threaded connection to produce the requisite forces.

The device 102 includes a frame 104, plungers 106,108 rotatably attached to the frame 104, double-sided stretch releasing adhesive strips 110,112 attached to the frame 104 to removably adhesively bond the frame 104 to a surface 114, and double-sided stretch releasing adhesive strips 116, 118 attached to the plungers 106,108 for adhesively bonding the plunger member 106 to surface 114 or an object 138 arranged between the plungers 106,108 and the surface 114.

The frame 104 includes an angle section 120 including first and second connecting portions 120a,120b arranged at an angle. As with the embodiment shown in FIGS. 1 and 2, connecting portions 120a,120b may be arranged at any angle depending on the intended end use application of the device, or the device may be provided with a hinge to allow the angle to be adjusted. Each connecting portion 120a,120b contains an opening 122,124, respectively for receiving plungers 106,108, respectively. In this embodiment, opening 122 is a threaded opening similar to openings 22 and 24 adapted to rotatably receive plunger 106, but opening 124 is not threaded and is adapted to slidably receive plunger 108.

The frame 104 further includes spaced parallel leg portions 120c,120d extending in the same direction from the first connecting portion 120a, and foot portions 120e,120f arranged at the end of each leg portion 120c,120d. Adhesive strips 110,112 are affixed to the bottom surfaces of the feet portions 120e,120f, respectively, to adhesively bond the frame 104 to surface 114, and thereby securely bond the device 102 to the surface 114.

Each plunger 106,108 is arranged generally perpendicular to connecting portion 120a. Plunger 106 includes a threaded cylindrical body portion 106a which rotatably engages and mates with opening 122. Plunger 108 includes a body portion 108 which slidably engages opening 124. Each plunger 106,108 includes a handle 126,128 arranged at one end of the body portion 106a,108a to facilitate manual actuation of the plungers 106,108 and a head 130,132 arranged at the end of the body portion 106a,108a opposite the handle 126,128. As with the embodiment of FIGS. 1 and 2, heads 126,128 are preferably connected with the plunger 106,108 with a slip fit type of connection to allow the body portion 106a,108a and the head 126,128 to move independently.

Spring 140 is provided between connecting portion 120b and the head 132. When plunger 108 is urged away from the surface 114, the spring 140 is compressed and urges head 132 in the direction of the surface 114. It will be recognized that when the device is used in this manner (i.e. as a clamp to generate a compressive force), adhesive strips 110,112 are needed to attach the device 102 to surface 114, but that adhesive strips 116,118 are not needed because the plungers 106,108 are maintained in contact with surface 114 via compression. To remove the device 102 from the surface 114, each adhesive strip 110, 112 is stretched in the known manner to debond the adhesive strip from the device and surface simultaneously.

Alternatively, the spring 140 can be a tension spring that is attached to connecting portion 120b and the head 132, such that when the spring is urged away from connecting portion 120b, the spring is put in tension. When head 132 is adhesively bonded with object 138 via adhesive strip 118, a tensile force is exerted on the object 138.

Device 102 may be used as a clamp to apply a force to surface 114 or object 138 in the same manner as the device of FIG. 1 except the spring 140 generates the force associated with plunger 108. More specifically, plunger 106 is rotated such that the head 130 moves in the direction of the surface 114 and spring 140 urges head 132 toward the surface 114. As the plungers 106,108 move toward and engage the surface 114 and object 138, a compressive force will be exerted on the surface and object, respectively. And to use the device 102 to impart a pulling or stretching force on the surface 114 and object 138, stretch releasing adhesive strips 116, 118 are attached to heads 130,132, thereby adhesively bonding the plungers 106,108 to the surface 114 and object 138, respectively. In this manner, when the plungers 106,108 move away from the surface 114 and object 138 by rotational actuation of the plunger 106 or the spring force imparted by spring 140, a tensile force will be exerted on the surface 114 and object 138, respectively. When device 102 is used to generate tensile forced, it is preferable to use adhesive strips 116,118 to attach the plungers 106,108 to the associated surface 114 and object 138, and to also use adhesive strips 110,112 to attach the frame with the surface 114.

The device, including both the frame and the plungers, may be formed of a variety of materials depending on the particular intended end use application of the device. Suitable materials include metals such as steel, synthetic plastic materials such as polycarbonate and polyvinyl chloride, and wood. The particular material selected is not significant to the invention hereof, so long as it provides the desired combination of properties such as adequate strength, low cost, and ease of manufacture.

It will be apparent to those of ordinary skill in the art that various changes and modifications may be made without deviating from the inventive concept set forth above. For example, it will be recognized that the size and shape of the device may be modified to adapt the device for certain specific end use applications, that the body member and plunger may be movably attached by means other than a threaded connection, that the number and size of the adhesive strips may be varied, and that the plunger may be provided with a pointed tip, drill bit, or other implement depending on the specific end use application intended for the device. Thus, the scope of the present invention should not be limited to the structures described in this application, but only by the structures described by the language of the claims and the equivalents of those structures.

What is claimed is:

1. A clamp-like device, comprising:
    (a) a frame including:
        (i) an angle section comprising a pair of connecting portions arranged at an angle, each said connecting portion containing at least one opening;
        (ii) a leg portion extending perpendicularly from the end of each connecting portion; and
        (iii) a foot portion arranged on the end of each leg portion;
    (b) at least two plungers arranged at an angle movably connected with said frame; and
    (c) double-sided stretch releasing adhesive attached to at least one of said frame and said plungers.

2. A device as defined in claim 1, wherein said stretch releasing adhesive is attached to said frame.

3. A device as defined in claim 1, wherein said stretch releasing adhesive is attached to said plungers.

4. A device as defined in claim 1, wherein each opening is threaded, and further wherein each plunger is externally threaded and is rotatably arranged within an associated opening.

5. A device as defined in claim 1, wherein stretch releasing adhesive for attaching said frame to a surface is provided on each foot portion.

6. A device as defined in claim 1, wherein said frame further includes a pair of parallel leg portions extending from the same connecting portion.

7. A device as defined in claim 1, wherein each said plunger includes a head adapted to receive stretch releasing adhesive.

8. A device as defined in claim 7, wherein each said plunger includes a handle to facilitate manual actuation of the associated plunger.

* * * * *